United States Patent [19]
Göktürk et al.

[11] Patent Number: 6,133,701
[45] Date of Patent: Oct. 17, 2000

[54] DRIVING CIRCUIT FOR OSCILLATORY ACTUATOR

[75] Inventors: Halit Suha Göktürk, Kadoma; Hideaki Abe, Neyagawa; Satoshi Nakayama, Hirakata; Toyokatsu Okamoto, Hikone, all of Japan

[73] Assignee: Matsushita Electric Works, Ltd., Osaka, Japan

[21] Appl. No.: 09/296,586

[22] Filed: Apr. 23, 1999

[30] Foreign Application Priority Data

Apr. 23, 1998 [JP] Japan ................... 10-113723

[51] Int. Cl.⁷ ....................... H02K 33/02
[52] U.S. Cl. ................ 318/114; 318/130; 318/129
[58] Field of Search ............... 310/47; 318/114, 318/126, 127, 128, 129, 130, 564, 610, 574, 565

[56] References Cited

U.S. PATENT DOCUMENTS

| | | | |
|---|---|---|---|
| 4,464,613 | 8/1984 | Brown | 318/119 |
| 5,004,965 | 4/1991 | Otokawa et al. | 318/254 |
| 5,176,311 | 1/1993 | Levine et al. | 228/4.5 X |
| 5,589,749 | 12/1996 | Davidson et al. | 318/564 |

*Primary Examiner*—Nick Ponomarenko
*Assistant Examiner*—Judson H. Jones
*Attorney, Agent, or Firm*—Burns, Doane, Swecker & Mathis, LLP

[57] ABSTRACT

An actuator driving circuit is provided for a positive feedback amplification, through an amplifier, of a counter electromotive force generated in a stator coil of a linear actuator, for continuating a reciprocating movement of a moving element by self-oscillation of the linear actuator, and for an application of a periodic voltage to the stator coil, while the voltage is made sinusoidal if required, so as to render the driving circuit to be high in the driving efficiency and small in dimensions.

22 Claims, 9 Drawing Sheets

DRIVING CIRCUIT FOR OSCILLATORY ACTUATOR

BACKGROUND OF THE INVENTION

This invention relates to an actuator driving circuit and, more particularly, to a driving circuit for oscillatory actuator having a moving element provided for a reciprocating movement.

DESCRIPTION OF RELATED ART

There has been provided an oscillatory actuator which comprises a stator consisting of an electromagnet, and a moving element having a permanent magnet and supported by a spring as a resetting means. The oscillatory actuator of the kind referred to is constituted such that the electromagnet forming the stator is provided, for example, with three stator magnetic poles arranged linearly at regular intervals, and a central one of the stator poles is excited to be differently polarized from other two stator poles by an exciting current flowing through a stator coil. The permanent magnet provided to the moving element is disposed movable in the direction in which the stator poles are arranged, and is magnetized to have two poles in the movable direction, and a distance between centers of these two magnetic poles of the permanent magnet is made substantially equal to a distance between centers of a pair of adjacent ones of the stator poles. The moving element is supported to be resettable substantially to the central position of the movable range.

When in the oscillatory actuator of this arrangement an alternating voltage of a rectangular waveform is applied to the stator coil, the moving element is caused to be moved to one side by means of a magnetic force between the stator poles and the permanent magnet during an excitation to one polarity of the stator coil, whereas the moving element is moved to the other side by the magnetic force between the stator poles and the permanent magnet during an excitation to the other polarity of the stator coil. In a period in which no voltage is applied to the stator coil, a resetting force to the center position of the movable range is applied to the moving element by a resilient force of the foregoing spring. That is, the moving element is enabled to perform a reciprocating movement by the application of the alternating voltage. Such oscillatory actuator realizes reciprocating type electric shaver with an inner movable blade coupled to the moving element of the actuator, utilizing the reciprocating movement of the moving element. Known art of this kind has been disclosed in, for example, U.S. Pat. No. 5,176,311 to Levne et al. and U.S. Pat. No. 5,589,749 to Davidson et al.

When, in this case, a load to be driven by the moving element fluctuates to cause oscillatory cycle of the moving element to be varied, there arises a risk that, even where measures for controlling operational timing with a sensor employed, the oscillatory cycle loses at least temporarily or continuously its synchronism with the excitation voltage applied to the stator coil so as to be in a malfunction. In the event of such asynchronism of the oscillatory cycle of the moving element with the excitation voltage, even the application of such periodic voltage as sinusoidal voltage to the stator coil causes a feedback to take place from the stator to the moving element for supplying an energy in a direction of deceleration, and there arises a problem that an evergy loss is eventually caused so as to have the driving efficiency deteriorated. In keeping the reciprocating movement of the moving element continued in the linear actuator of the foregoing arrangement, further, the voltage application to the stator coil should preferably be controlled in its timing in accordance with the position of the moving element. That is, the driving energy can be reduced by exciting the stator coil in synchronism with the natural frequency of the moving element to attain a resonating state. Accordingly, such sensor as a photointerrupter is provided for sensing that the moving element has passed through a specific position, and the timing of the voltage application to the stator coil is controlled. However, the provision of such sensor causes a circuit to be required for controlling the sensor and processing outputs of the sensor, and a problem to arise that the actuator is enlarged in dimensions as a whole.

Further, the foregoing application of the rectangular waveform alternating voltage to the stator coil causes a current containing much of higher harmonic components to flow to the stator coil. A comparison of efficiency of the application of a sinusoidal voltage to the stator coil with that of the application of the rectangular waveform voltage to the stator coil has revealed that the application of the rectangular waveform voltage is inferior, and this voltage application results in such problem that, when employed in battery-powered electric appliances and equipments, the battery has to be exchanged or recharged remarkably frequently.

SUMMARY OF THE INVENTION

An object of the present invention is to provide a driving circuit for oscillatory actuator which is capable of eliminating the foregoing problems, synchronizing the timing of the voltage application to the electromagnet coil with the reciprocating movement of the moving element, still minimizing the dimensions with any position sensor made unnecessary, and rendering the driving efficiency not to be deteriorated even upon fluctuation of the load with an application of the sinusoidal voltage or current to the electromagnet coil.

According to the present invention, this object can be attained by means of a driving circuit for the oscillatory actuator wherein at least one of the stator and moving element is provided with an electromagnet, means is provided for resetting the moving element to a predetermined position when the electromagnet is not excited, and the moving element is caused to perform its reciprocating movement due to variation in the magnetic force acting between the electromagnet and the moving element upon application of the alternating voltage to the electromagnet, characterized in that the applied voltage to the coil of the electromagnet is generated by a self-excitation oscillation with a positive feedback of a counter electromotive force occurring in the coil of the electromagnet in correspondence to the reciprocating movement of the moving element.

Other objects and advantages of the present invention shall become clear as the description of the invention advances as detailed with reference to embodiments shown in accompanying drawings.

Figure 1:
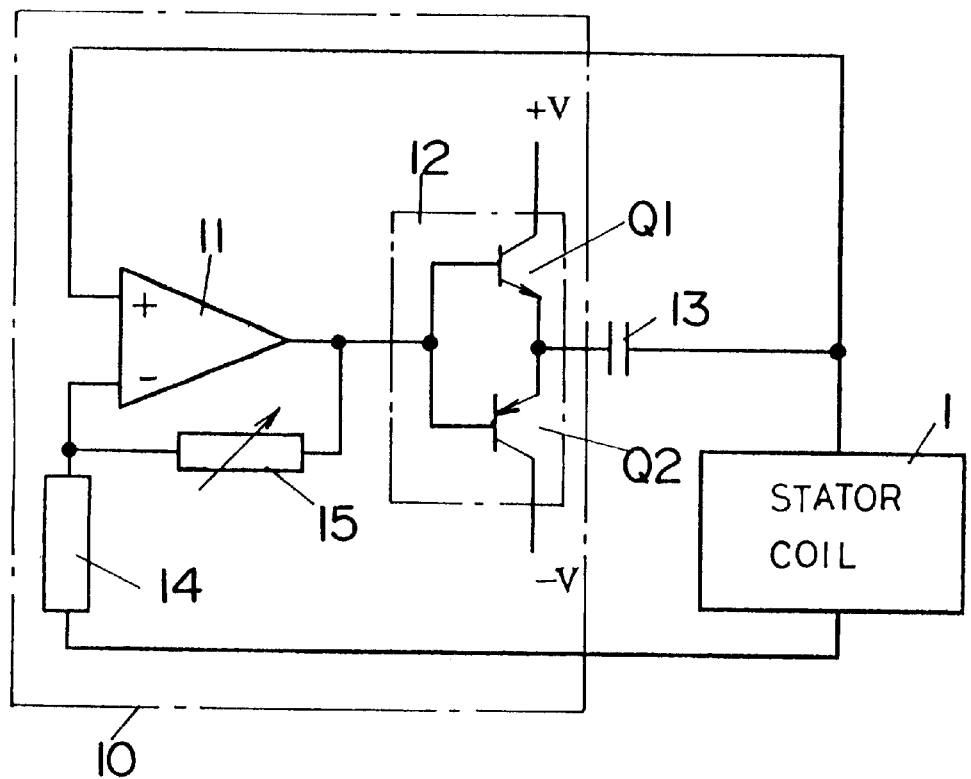
FIG. 1 is a circuit diagram of an embodiment of the driving circuit for the actuator according to the present invention.

While the present invention shall now be described with reference to the respective embodiments shown in the drawings, it should be appreciated that the intention is not to limit the present invention only to these embodiments but rather to include all alterations, modifications and equivalent arrangements possible within the scope of appended claims.

DETAILED DESCRIPTION OF THE PREFERRED EMBODIMENTS

The present invention will now be described in the followings with reference to the embodiments. While the embodiments according to the present invention are described in the followings with reference to the oscillatory actuator, in particular the linear actuator in which the electromagnet and permanent magnet are combined for rectilinear reciprocating motion, it is possible to apply the technical idea of the present invention also to other types of the oscillatory actuators.

In FIG. 1, an embodiment according to the present invention is shown, in which such amplifier as an operational amplifier 11 is connected at an output terminal through a driving circuit 12 to an end of a capacitor 13. The other end of this capacitor 13 is connected to a non-inverted input terminal of the operational amplifier 11 and also to an end of a stator coil 1 forming a linear actuator. A resistor 14 is inserted between the other end of the stator coil 1 and an inverted input terminal of the operational amplifier 11, and a variable resistor 15 is inserted between the output terminal and the inverted input terminal of the operational amplifier 11.

Figure 2:
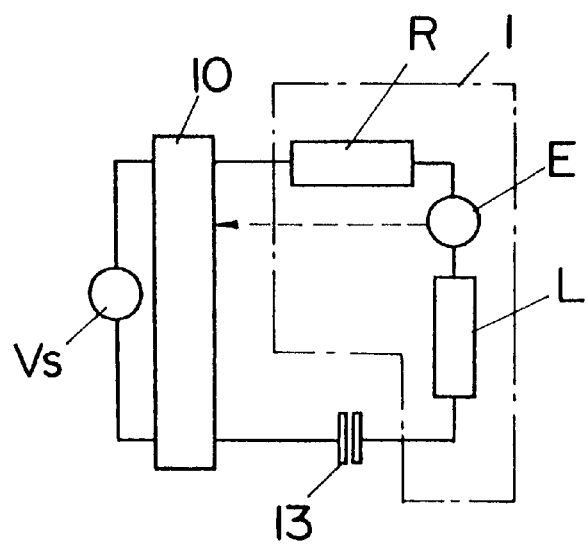
FIG. 2 is an explanatory diagram for the principle of the driving circuit of FIG. 1.

The driving circuit 12 is formed with a pair of transistors Q1 and Q2 in a complementary connection and is provided for boosting an output voltage of the operational amplifier 11 to a source voltage (±V), and a voltage capable of driving the linear actuator is thereby obtained. While it is assumed here that a battery or batteries will be used as the power source, any other power source may be used. The capacitor 13 is set in accordance with the natural frequency of the moving element of the linear actuator, and a series resonance circuit formed by the stator coil 1 and capacitor 13 is set to have a resonance frequency conforming to the natural frequency of the moving element of the linear actuator. At this time, the circuit shown in FIG. 1 can be represented by such equivalent circuit as shown in FIG. 2, in which the linear actuator is regarded as being a series circuit of a DC resistor R of the stator coil 1, and inductance L of the stator coil 1 and a counter electromotive force E, and the circuit other than the capacitor 13 is forming a control circuit 10. A power source Vs for applying a source voltage to the driving circuit 12 is provided to the control circuit 10, the counter electromotive force E is caused to be generated by an intersection of magnetic flux of the permanent magnet with respect to the stator coil 1 upon movement of the moving element in the linear actuator, and a sinusoidal signal corresponding to the frequency of the moving element in the linear actuator is to be generated. As this signal is input to the non-inverted input terminal of the operational amplifier 11, the signal is subjected to a positive feedback amplification, and the circuit shown in FIG. 1 is to perform a self-oscillation. Since the frequency of this oscillation relies on the frequency of mechanical system of the linear actuator, an excitation voltage of a frequency corresponding to any fluctuation in the load of the linear actuator is applied to the stator coil 1. Further, as the linear actuator itself is forming a required resonance system for the oscillation, the resonance system can be omitted in contrast to an event where the applied voltage to the stator coil 1 is generated with a separate circuit for the self-oscillation (that is, in the event of a separately-excited oscillation), and required parts number can be reduced by that extent.

Figure 3:
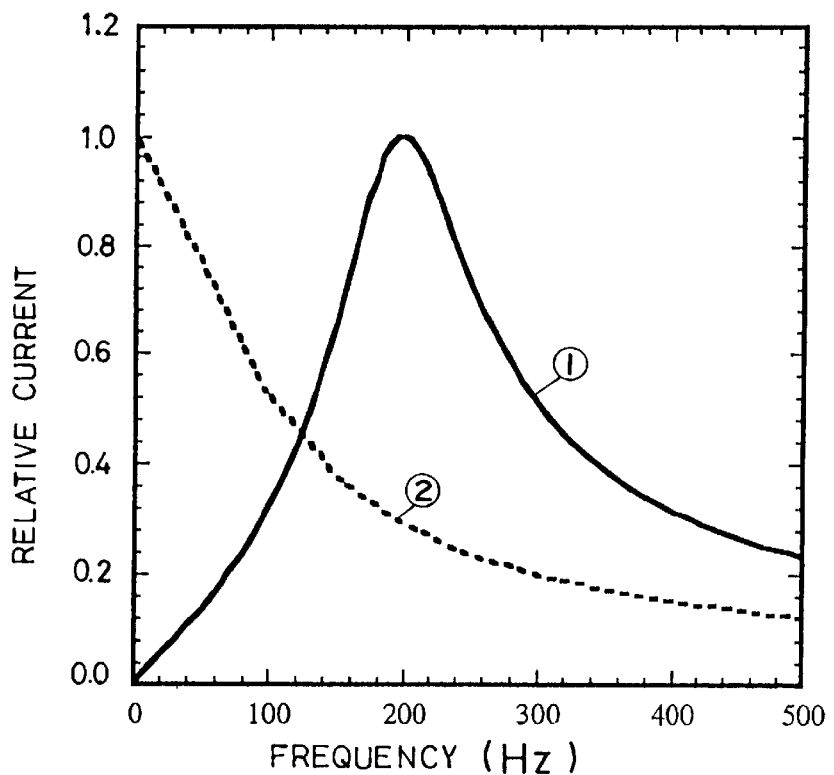
FIGS. 3 to 5 are explanatory diagrams for the operation of the driving circuit in FIG. 1, respectively.
Figure 4:
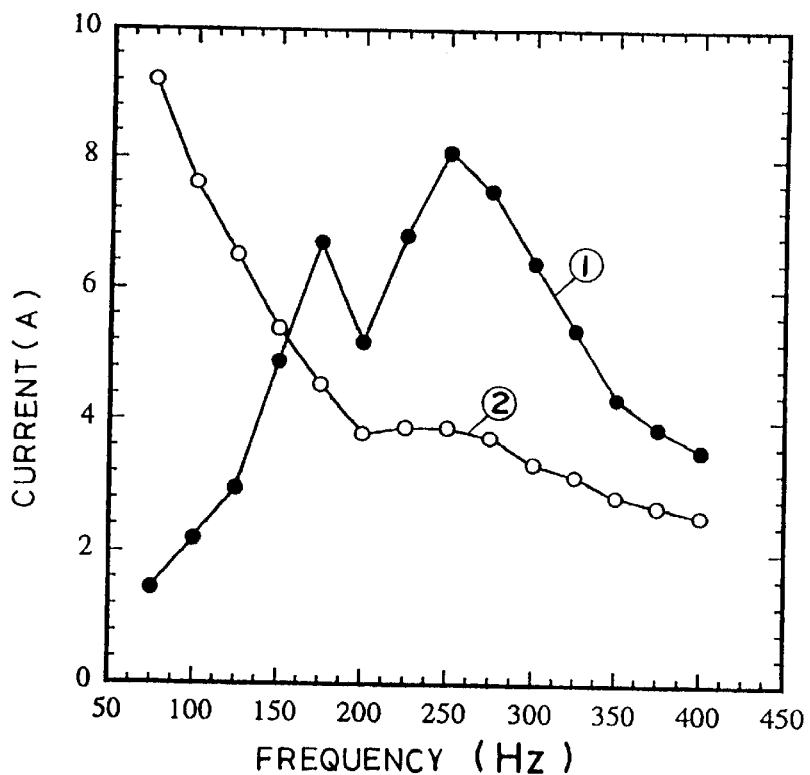
Figure 5:
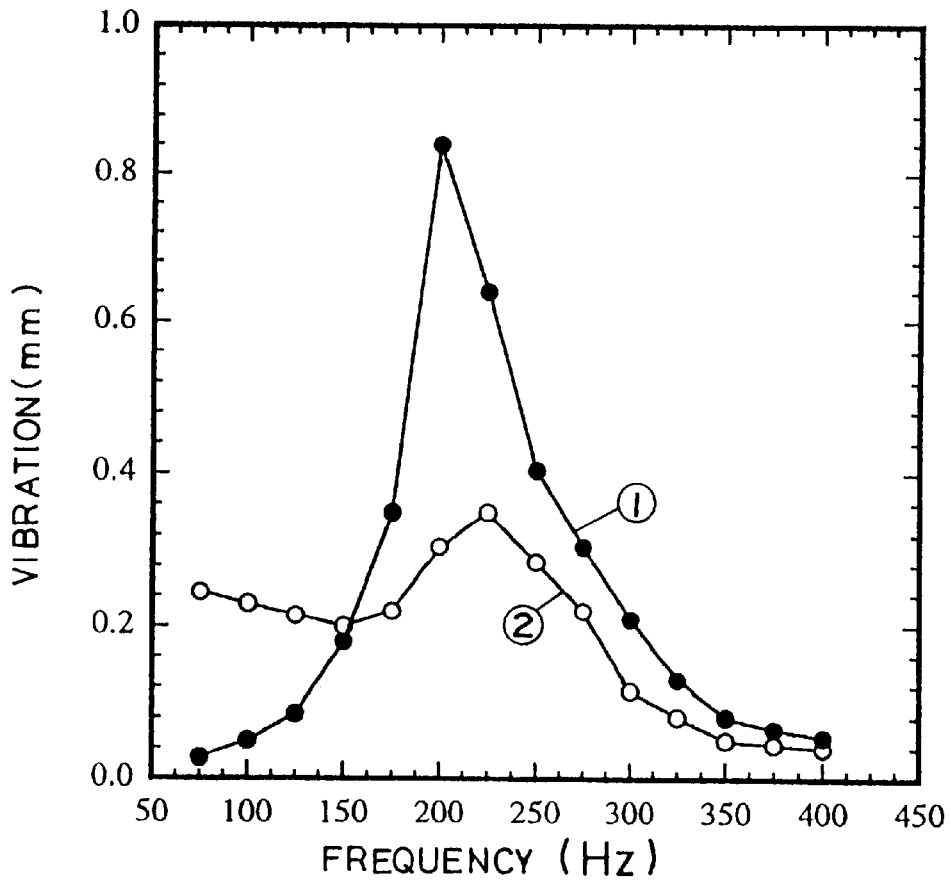

Since in the foregoing circuit arrangement a momentary position of the moving element in the linear actuator and a momentary value of the excitation voltage for the stator coil 1 coincide with each other, a driving force acting on the moving element is to be proportional to a square of a current flowing to the stator coil 1. Further, as the resonance frequency of the series resonance circuit of the stator coil 1 and capacitor 13 is made to coincide with the natural frequency of the moving element of the linear actuator, so that, in an event of non-load and when the excitation voltage applied to the stator coil 1 is in conformity with the natural frequency of the linear actuator, a composite reactance of an inductance component of the stator coil 1 and a capacitance component of the capacitor 13 will be substantially zero. As a result, a circuit impedance can be in a state close only to a resistance component. Accordingly, it is enabled that a large current is caused to flow to the stator coil 1 and the linear actuator can be efficiently driven. With the foregoing provision of the capacitor 13, therefore, the driving force acting on the moving element can be made larger than in an aspect where no capacitor is employed. Provided here that the linear actuator is employed as a driving source of an electric shaver and shows such natural frequency as shown by a curve "1" of FIG. 3 in no-load state (about 200 Hz), the natural frequency is caused to be deviated remarkably as shown, for example, by a curve "2" of FIG. 3 upon application of a load with beard hair being shaved. Since in the present embodiment the resonance state is intended to be maintained with the provision of the capacitor 13, it is possible to enlarge the current value adjacent to the natural frequency as shown by a curve "1" in FIG. 4 in contrast to an aspect of no capacitor 13 as shown by a curve "2" in FIG. 4, and the driving force acting on the moving element become twice as large, as shown by a curve "1" in FIG. 5, as that where no capacitor is used as shown by a curve "2" in FIG. 5. That is, any efficiency deterioration or malfunction can be effectively prevented from occurring even upon fluctuation in the load.

Figure 6:
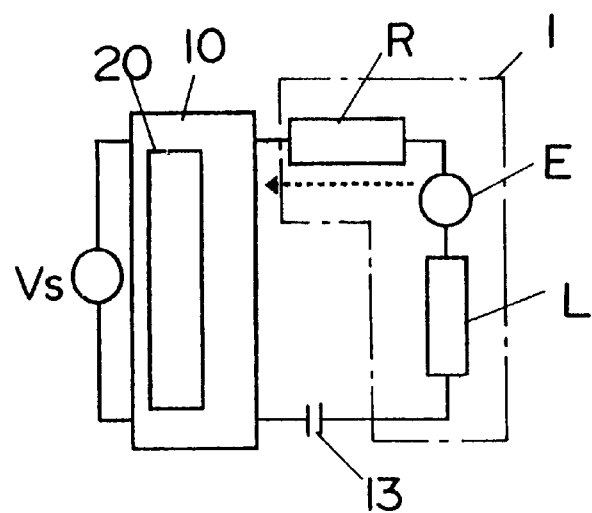
FIG. 6 is a schematic circuit diagram showing another embodiment of the present invention.
Figure 7:
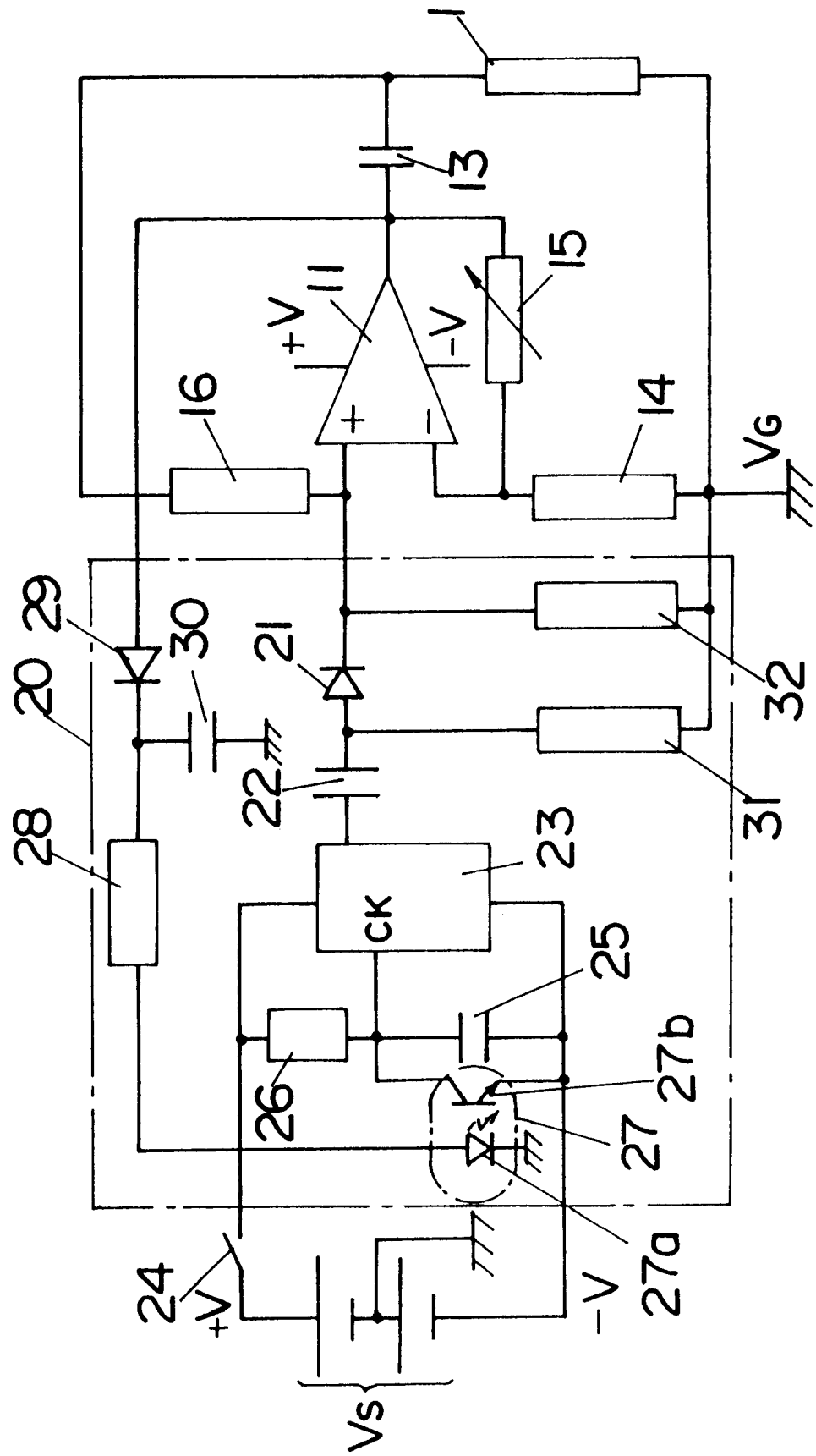
FIG. 7 is a detailed circuit diagram of the embodiment of FIG. 6.

While in the above embodiment the arrangement is so made as to start the operation of the linear actuator with the connection to the power source, another embodiment shown in FIG. 6 of the present invention employs a starting circuit 20 added to the control circuit 10. While in the circuit of FIG. 6 the driving circuit 12 is also disposed on output side of the operational amplifier 11, the driving circuit 12 is omitted from FIG. 6. The starting circuit 20 comprises, as shown in FIG. 7, a one-shot multivibrator 23 connected through a diode 21 and a capacitor 22 to the non-inverted input terminal of the operational amplifier 11, and a series circuit of a capacitor 25 and a resistor 26 connected across both terminals of the power source Vs through a switch 24 and, at a junction point between the capacitor 25 and resistor 26, to a trigger terminal CK of the one-shot multivibrator 23. The power source Vs is provided for outputting the voltage of ±V and has a grounding terminal at a middle point. Across the capacitor 25, further, a phototransistor 27a forming a light-receiving element of a photocoupler 27 is connected in parallel, and a light-emitting diode 27a forming a light-emitting element of the photocoupler 27 is connected, through a current-limiting resistor 28 and a rectifying diode 29, to the output terminal of the operational amplifier 11. Between a junction point of the resistor 28 to the diode 29 and the grounding terminal of the power source Vs, a smoothing capacitor 30 is connected. Between each of both ends of the diode 21 and the grounding terminal of the power source Vs, resistors 31 and 32 are respectively connected. Instead of direct connection of the junction point between the stator coil 1 and the capacitor 13 to the non-inverted input terminal of the operational amplifier 11, a resistor 16 is inserted between them.

Figure 8:
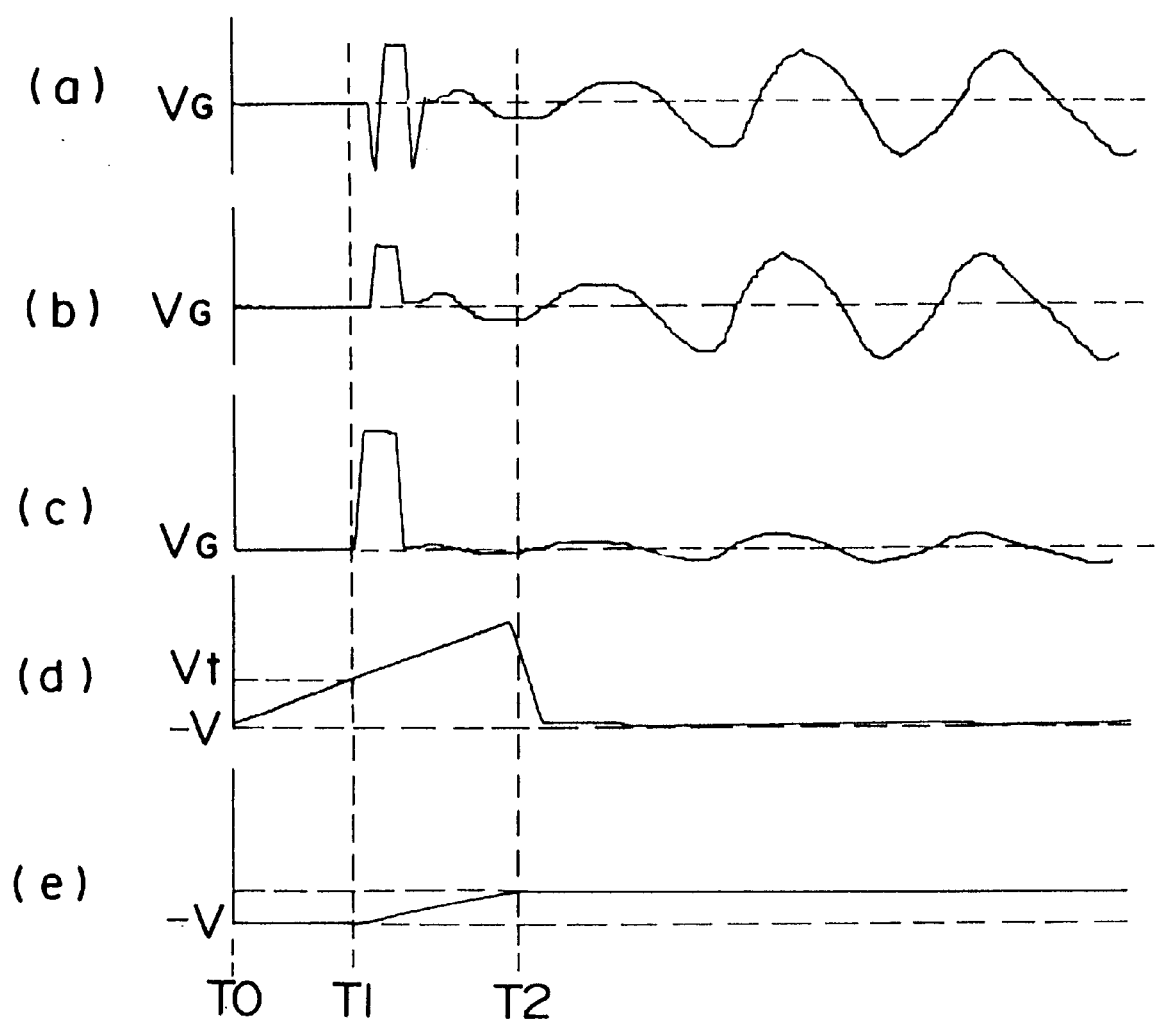
FIGS. 8(a) to 8(e) are waveform diagrams explanatory for the operation of the embodiment of FIG. 6.

Now, the circuit shown in FIG. 7 operates as follows. When the circuit is connected to the power source Vs with the switch 24 made ON at a time T0 of FIG. 8, the capacitor 25 is charged through the resistor 26 so that, as in FIG. 8(d), a voltage across the capacitor 25 rises with time. The one-shot multivibrator 23 employed here is to be triggered at a rising of trigger signal so that, as the voltage across the capacitor 25 reaches at a time T1 a trigger voltage Vt of the one-shot multivibrator 23, a pulse signal of a constant pulse width is output from the multivibrator 23. That is, at the time T1, such pulse voltage as in FIG. 8(c) grows as a voltage across the resistor 32. With this pulse voltage input to the operational amplifier 11, such voltage as in FIG. 8(b) is provided as an output of the operational amplifier 11, and such voltage as in FIG. 8(a) is applied to the stator coil 1. With this voltage applied, the linear actuator starts its operation to generate a counter electromotive force.

Even upon termination of this input from the one-shot multivibrator 23 to the operational amplifier 11, the counter electromotive force of the linear actuator is fed back to the operational amplifier 11, and the operating state of the linear actuator is thereby maintained. That is, such periodic voltage as sinusoidal voltage can be applied to the stator coil 1 so that the exciting voltage or current to the stator coil 1 converges to a state of causing the linear actuator to stably operate.

In an event where the output voltage can be obtained continuously from the operational amplifier 11, a voltage across the capacitor 30 rises as in FIG. 8 (e), and, at a time T2, this voltage reaches a state of being retained substantially at a constant voltage. As the voltage across the capacitor 30 rises, a light output of the light-emitting diode of the photocoupler 27 increases, the phototransistor 27b gradually increases its conduction, whereby a charge in the capacitor 25 is caused to be discharged through the phototransistor 27b, and the voltage applied to the trigger terminal CK of the one-shot multivibrator 23 can be maintained to be substantially zero during the operation of the linear actuator. Once the linear actuator stops due to some cause or the switch 24 once turned OFF is again turned ON, the capacitor 25 is charged again, and the foregoing operation is repeated.

In the embodiment of FIGS. 6 to 8, as has been described, the start of the operation of the actuator is made easier by the provision of the starting circuit 20, and the linear actuator is enabled to re-start automatically even when the linear actuator is once stopped for some reason, without requiring the switch 24 to be turned ON. Other arrangements and operation of this embodiment are the same as those in the embodiment of FIGS. 1 to 5.

Figure 9:
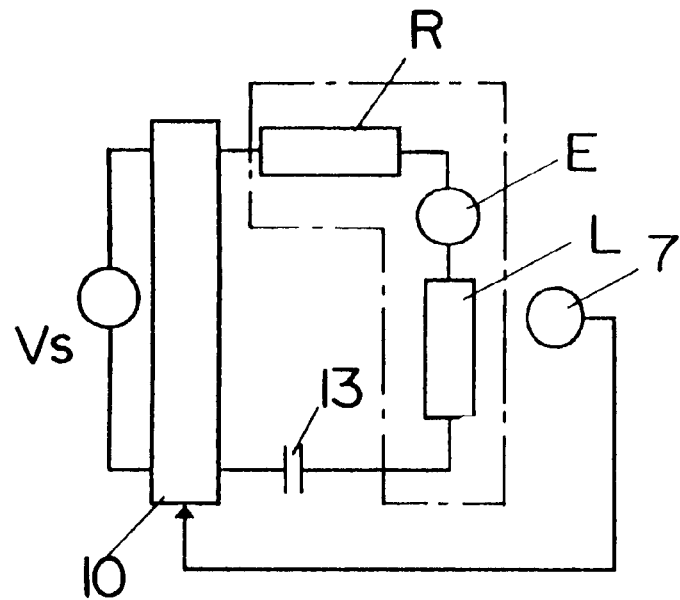
FIG. 9 is a schematic circuit diagram showing an aspect of another embodiment of the present invention.
Figure 10:
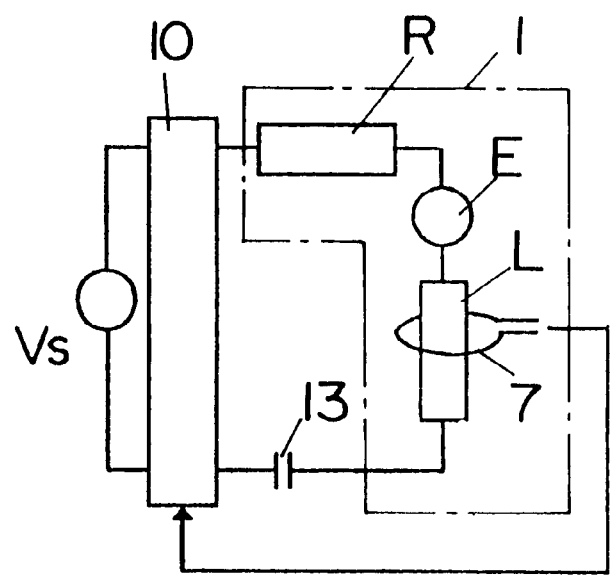
FIG. 10 is a schematic circuit diagram showing another aspect of the embodiment of FIG. 9.

While in the respective embodiments of FIGS. 1 to 5 and FIGS. 6 to 8 the arrangement is so made as to maintain the operation of the linear actuator with the feedback of the counter electromotive force occurring in the stator coil 1 of the linear actuator, another embodiment of FIG. 9 according to the present invention employs a detection coil 7 in the linear actuator for detecting an induced electromotive force in the stator coil 1, and the operation of the linear actuator is controlled by feeding an output of this detection coil 7 back to the control circuit. As shown in FIG. 9, the detection coil 7 is provided separately from the electromagnet 3. In this case, the detection coil 7 may be disposed adjacent to the electromagnet 3 or even as wound on the electromagnet 3 as in FIG. 10.

In the foregoing embodiment of FIG. 9, the movement of the moving element is detected by means of the induced electromotive force, and the voltage applied to the stator coil is fed back in correspondence to the induced electromotive force, so that the operation is enabled to be equivalent to the case of feeding back the counter electromotive force. Also, similar to the case of the feedback of the counter electromotive force, the periodic voltage is eventually applied to the stator coil 1. Other arrangements and operation are the same as those in the embodiment of FIGS. 1 to 5.

Figure 11A:
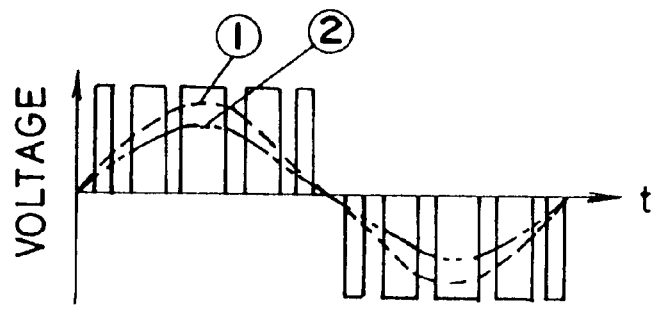
FIGS. 11(a) and 11(b) are waveform diagrams explanatory for the operation in another embodiment of the present invention.
Figure 11B:
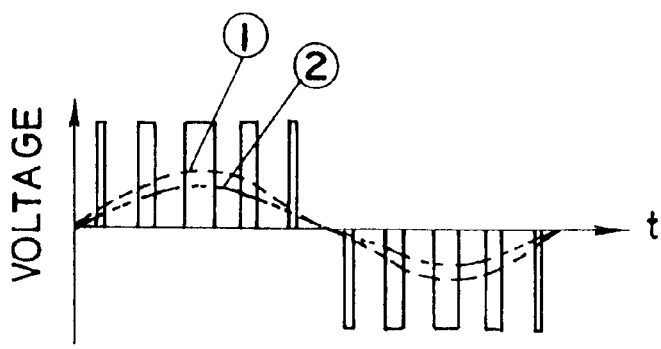

While in the respective foregoing embodiments the arrangement is made so that the periodic, continuous waveform voltage will be applied to the stator coil 1, such various waveforms as rectangular, sinusoidal and the like waveforms can be obtained with a proper circuit arrangement employed. Another embodiment according to the present invention as shown in FIGS. 11(a) and 11(b) is arranged for rendering an applied voltage or current to the stator coil 1 to be equivalent to the sinusoidal voltage or current by applying to the stator coil 1 a pulse voltage of a pulse width varying with time. That is, the pulse width is so controlled that the pulse voltage in the average value in respective minute periods into which the time is equally divided will be equal to corresponding part of the sinusoidal voltage. This type of control can be easily realized by an application of a technique known as a PWM (pulse width modulation) control. Further, the applied voltage (of curves "1" in FIG. 11) is enabled to be adjusted to be relatively high as in FIG. 11(a) and to be relatively low as in FIG. 11(b). The excitation current (of curves "2" in FIG. 11) can be also made sinusoidal.

Further, with a provision of such output detecting coil 7 as in the embodiment of FIG. 9, the linear actuator is made applicable to the feedback control. The same effect can be attained even when the capacitor 13 is omitted. Other arrangements and operation are the same as those in the embodiment of FIGS. 1 to 5.

Figure 12:
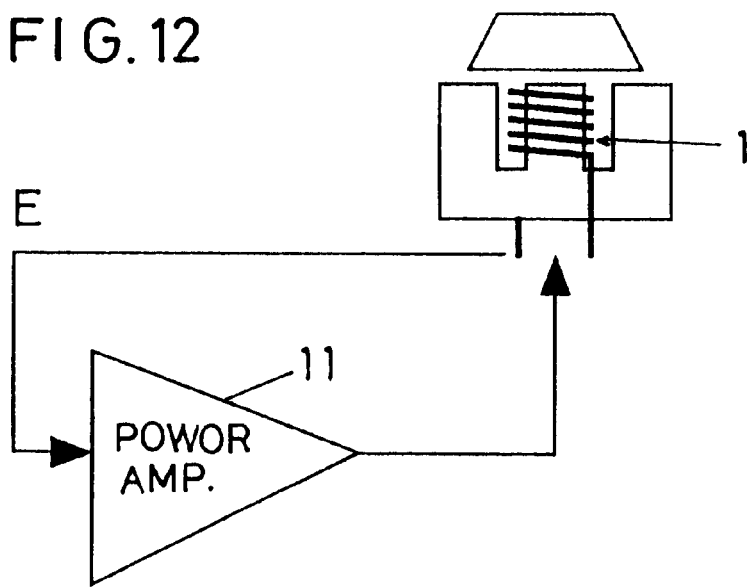
FIG. 12 is a schematic diagram showing an arrangement in another embodiment of the present invention.

In another embodiment shown in FIG. 12, an actuator driving circuit useful specifically when employed in acoustic equipments. In this case, a counter electromotive force E is provided from the stator coil 1 of the oscillatory actuator through a positive feedback path to the operational amplifier 11, and an output of the operational amplifier 11 is provided back to the stator coil 1. With this arrangement, a voltage substantially of the same level as the source voltage (±V) can be continuously provided continuously to the stator coil 1, with any fluctuation minimized.

Figure 13:
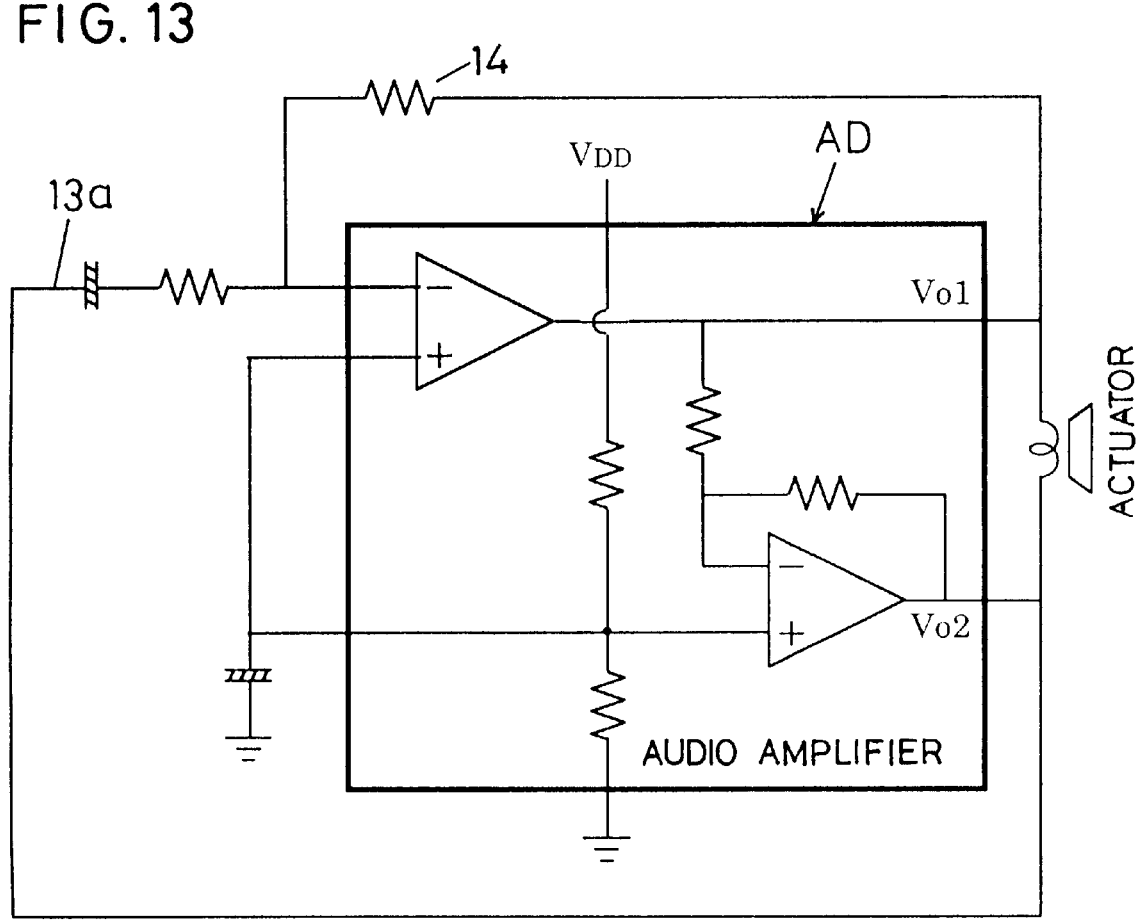
FIG. 13 is a circuit diagram showing a practical example of the embodiment of FIG. 12.

More specifically, FIG. 13 shows a practical example of the embodiment of FIG. 12, in which the driving circuit is combined with a bridge-type audio amplifier AD which per se has been known. The oscillatory actuator can be employed in a speaker system, such that a unique arrangement causes a positive feedback output denoted by Vo to be provided in response to the counter electromotive force. At this time, the output denoted by Vo1 is subjected to a negative feedback so as to adjust a gain of the operational amplifier 11. With this arrangement, an optimumly set voltage $V_{DD}$ can be provided.

Figure 14:
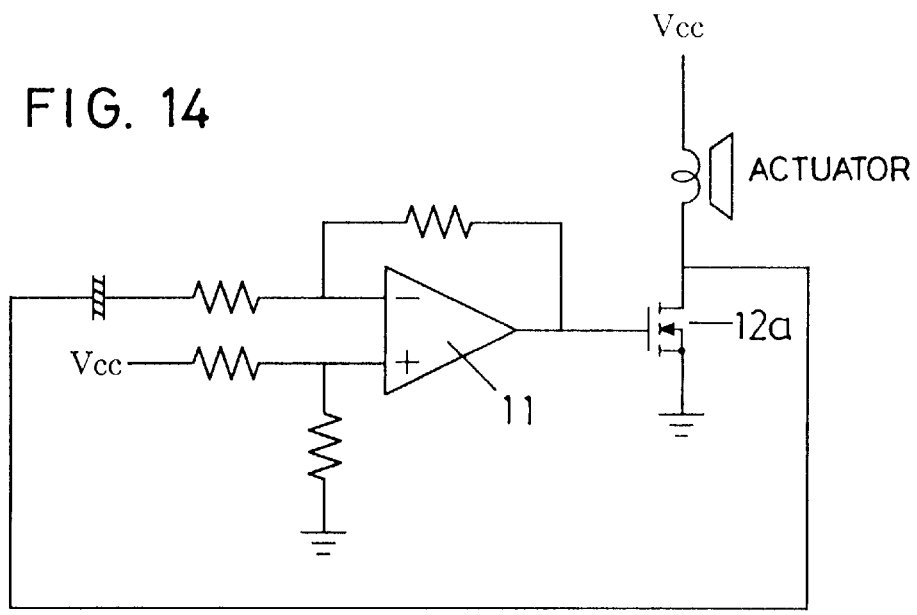
FIGS. 14 and 15 are circuit diagrams respectively showing still another embodiment of the present invention.

In another embodiment shown in FIG. 14, the operational amplifier 11 is connected to a single sided DC power source, a bias voltage is sent to the non-inverted input terminal of the amplifier, and a bipolar oscillation can be realized. Further, the arrangement is so made that output of the operational amplifier 11 triggers a MOS type switching element to have a driving current provided, whereby a threshold voltage can be effectively lowered, and the oscillatory voltage of the actuator upon starting can be increased to be twice to four times as large.

Figure 15:
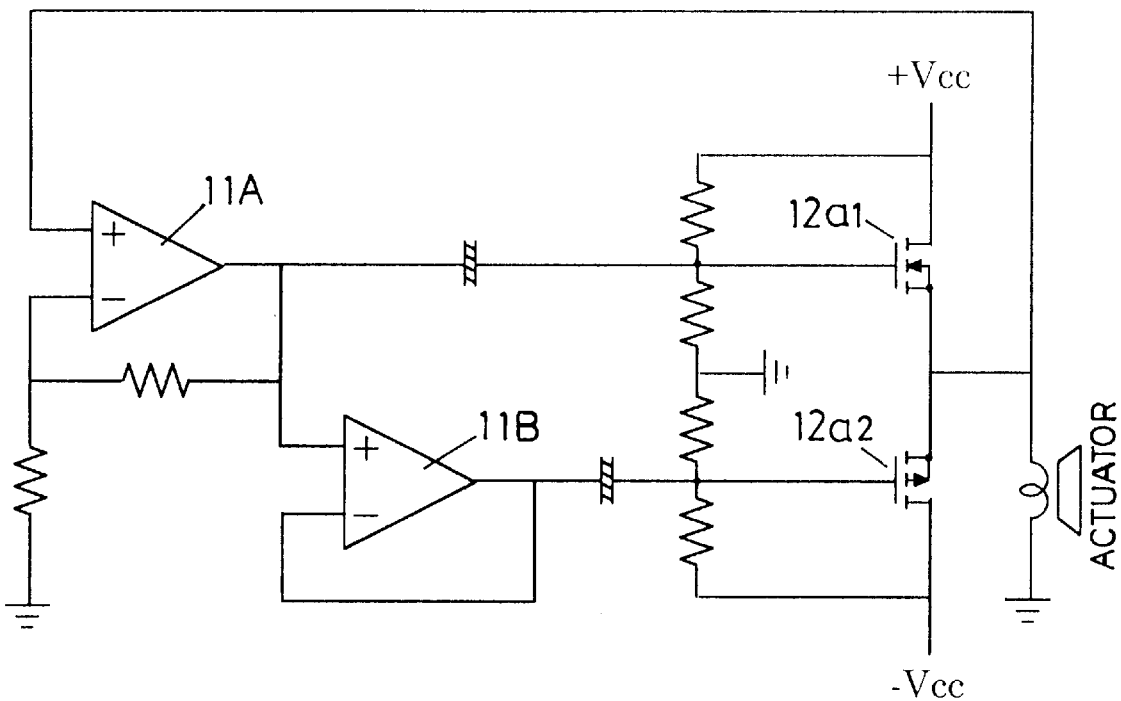

In still another embodiment of the present invention as shown in FIG. 15, in contrast to the embodiment of FIG. 14, the output terminal of one operational amplifier 11A is connected to the non-inverted input terminal of the other operational amplifier 11B, to have a driving input provided to P-channel of MOS type switching elements, whereby a rise of the oscillation can be made further easier.

While in the foregoing description the operational amplifier has been mainly referred to, the invention is not limited only to the use thereof but may similarly employ any other amplifier so long as the same function is attainable.

According to the present invention as has been described, the self-oscillation is performed with the positive feedback of the counter electromotive force grown in the coil of the electromagnet, so that the periodic voltage synchronizing with the mechanical oscillation of the oscillatory actuator can be applied to the electromagnet, and it is enabled to drive the oscillatory actuator at a high efficiency. Further, while the timing of voltage application to the coil of the electromagnet is synchronized with the reciprocating movement of the moving element, any separate sensor for detecting the position of the moving element is made unnecessary, so as to be advantageous in that the circuit arrangement is simplified and can be thus minimized in dimensions. Further, the self-oscillation stabilizes the oscillation, so that there arise various advantages such that the driving efficiency is rendered less deteriorated, the applied voltage or current to the actuator coil can be made sinusoidal to render the effect to be higher, and so on, as will be readily appreciated.

What is claimed is:

1. A driving circuit for oscillatory actuator in which at least one of a stator and a moving element includes an electromagnet, means is provided for resetting the moving element to a predetermined position in non-exciting state of the electromagnet, and the moving element is caused to perform its reciprocating movement due to variation in the magnetic force acting between the electromagnet and the moving element upon application of an alternating voltage to the electromagnet, wherein the circuit comprises means for applying to a coil of the electromagnet a positive feedback of a counter-electromotive force occurring in the coil of the electromagnet in correspondence to the reciprocating movement of the moving element, and a control circuit for generating the applied voltage to the coil of the electromagnet through a self-oscillation.

2. The driving circuit according to claim 1 wherein the control circuit applies to the coil of the electromagnet a driving voltage immediately after connection of the circuit to a power source.

3. The driving circuit according to claim 1 wherein the control circuit comprises an amplifier performing a positive feedback of a counter electromotive force occurring in the coil of the electromagnet in correspondence to the reciprocating movement of the moving element, and a variable resistor for adjusting the amplification of the amplifier to adjust the amplitude of the applied voltage to the coil of the electromagnet.

4. The driving circuit according to claim 3 wherein the control circuit further comprises a one-shot multivibrator generating a pulse signal immediately after connection of the circuit to a power source, the pulse signal being provided to the amplifier to have a starting voltage generated and applied to the coil of the electromagnet.

5. The driving circuit according to claim 1 wherein the control circuit generates the applied voltage to the coil of the electromagnet with a voltage of discontinuous waveform in an equivalent manner.

6. The driving circuit according to claim 5 wherein the voltage of discontinuous waveform is a rectangular wave voltage having a pulse width sufficiently smaller than a cycle of the reciprocating movement of the moving element and varying with time.

7. The driving circuit according to claim 5 wherein the applied voltage is of a sinusoidal waveform.

8. The driving circuit according to claim 1 wherein the circuit further comprises a capacitor inserted between the control circuit and the coil of the electromagnet to form a series resonance circuit together with the coil, and means for resonating the series resonance circuit at a resonance frequency made to coincide with a natural frequency of the moving element.

9. The driving circuit according to claim 8 wherein the control circuit generates a voltage applied to the coil of the electromagnet through a self-oscillation with a positive feedback of a counter electromotive force occurring in the coil of the electromagnet in correspondence to the reciprocating movement of the moving element.

10. The driving circuit according to claim 8 wherein a detection coil is provided for detecting magnetic flux generated by the coil of the electromagnet, and the control circuit generates the voltage applied to the coil of the electromagnet through a self-excitation oscillation with a positive feedback of an induced electromotive force occurring in the coil of the electromagnet in correspondence to the reciprocating movement of the moving element.

11. The driving circuit according to claim 10 wherein the detection coil is prepared separately from the electromagnet and is disposed adjacent to the electromagnet.

12. The driving circuit according to claim 10 wherein the detection coil is wound on the electromagnet.

13. The driving circuit according to claim 8 wherein the control circuit applies to the coil of the electromagnet a driving voltage immediately after connection of the circuit to a power source.

14. The driving circuit according to claim 8 wherein the control circuit comprises an operational amplifier performing a positive feedback of a counter electromotive force occurring in the coil of the electromagnet in correspondence to the reciprocating movement of the moving element, and a variable resistor for adjusting the amplification of the operational amplifier to adjust the amplitude of the applied voltage to the coil of the electromagnet.

15. The driving circuit according to claim 8 wherein the circuit further comprises a one-shot multivibrator for generating a pulse signal immediately after connection of the circuit to a power source, the pulse signal being provided to an operational amplifier for causing a starting voltage to be generated and applied to the coil of the electromagnet.

16. The driving circuit according to claim 8 wherein the circuit is provided for use in acoustic devices and equipments.

17. The driving circuit according to claim 16 wherein the control circuit generates a voltage applied to the coil of the electromagnet through a self-oscillation with a positive feedback of a counter electromotive force occurring in the coil of the electromagnet in correspondence to the reciprocating movement of the moving element.

18. The driving circuit according to claim 17 wherein a detection coil is provided for detecting magnetic flux generated by the coil of the electromagnet, and the control circuit generates the voltage applied to the coil of the electromagnet through a self-excitation oscillation with a positive feedback of an induced electromotive force occurring in the coil of the electromagnet in correspondence to the reciprocating movement of the moving element.

19. The driving circuit according to claim 17 wherein the detection coil is prepared separately from the electromegnet and is disposed adjacent to the electromagnet.

20. The driving circuit according to claim 17 wherein the detection coil is wound on the electromagnet.

21. The driving circuit according to claim 16 wherein the control circuit applies to the coil of the electromagnet a driving voltage immediately after connection of the circuit to a power source.

22. A driving circuit for oscillatory actuator in which at least one of a stator and a moving element includes an electromagnet, means having an elasticity is provided for resetting the moving element to a predetermined position in non-exciting state of the electromagnet, and the moving element is caused to perform its reciprocating movement due to variation in the magnetic force acting between the electromagnet and the moving element upon application of an alternating voltage to the electromagnet, wherein the circuit comprises a control circuit for applying a sinusoidal exciting voltage to a coil of the electromagnet, a capacitor inserted between the control circuit and the coil of the electromagnet to form a series resonance circuit together with the coil, and means for resonating the series resonance circuit at a resonance frequency made to coincide with a natural frequency of the moving element.

* * * * *